(12) United States Patent
Valentine et al.

(10) Patent No.: US 10,053,077 B2
(45) Date of Patent: Aug. 21, 2018

(54) METHOD OF CONTROLLING AN ASPIRATOR VALVE

(71) Applicant: Ford Global Technologies, LLC, Dearborn, MI (US)

(72) Inventors: Paul Robert Valentine, Hornchurch (GB); Tom Leroy, Dagenham (GB); Kevin Brett, North stifford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/678,773

(22) Filed: Aug. 16, 2017

(65) Prior Publication Data

US 2018/0050677 A1 Feb. 22, 2018

(30) Foreign Application Priority Data

Aug. 17, 2016 (GB) .................................. 1614051.9

(51) Int. Cl.
*B60T 7/12* (2006.01)
*B60T 13/52* (2006.01)
*B60T 17/22* (2006.01)

(52) U.S. Cl.
CPC ............. *B60T 13/52* (2013.01); *B60T 17/221* (2013.01); *B60T 2210/00* (2013.01); *B60T 2270/406* (2013.01); *B60T 2270/84* (2013.01)

(58) Field of Classification Search
CPC ................. B60T 13/52; B60T 2270/84; B60T 2270/406; B60T 17/221; B60T 2210/00
See application file for complete search history.

(56) References Cited

U.S. PATENT DOCUMENTS

| 2010/0047081 A1* | 2/2010 | Hirooka .................. B60T 13/52 417/54 |
| 2015/0352604 A1 | 12/2015 | Arunasalam et al. |
| 2016/0214592 A1 | 7/2016 | Leroy et al. |

FOREIGN PATENT DOCUMENTS

| GB | 2532092 A | 5/2016 |
| JP | 2008267270 A | 11/2008 |

* cited by examiner

*Primary Examiner* — Hung Q Nguyen
(74) *Attorney, Agent, or Firm* — Burgess Law Office, PLLC; Raymond L. Coppiellie (57) ABSTRACT

A method of controlling an aspirator valve of a vacuum assisted braking system that rapidly fully opens and closes the aspirator valve when an engine of a motor vehicle has been shut-down and the current conditions indicate that ice is likely to have formed in the aspirator valve. The rapid opening and closing of the aspirator valve breaks up any ice buildup thereby de-icing the aspirator valve and allowing normal aspirator valve operation.

14 Claims, 7 Drawing Sheets

METHOD OF CONTROLLING AN ASPIRATOR VALVE

CROSS-REFERENCE TO RELATED APPLICATIONS

Not Applicable

BACKGROUND OF THE INVENTION

1. Field of the Invention

This invention relates to an aspirator valve and, in particular, to a method reducing aspirator valve malfunction due to icing.

2. Description of Related Art

A motor vehicle vacuum assist braking system may include a brake booster/vacuum servo amplifying the force input from a driver of the motor vehicle.

The vacuum assisted braking system may use the vacuum in an inlet manifold of the engine as a vacuum source for the brake booster. However, the level of the vacuum in the inlet manifold of the engine varies considerably during engine use resulting in times when there is little or no vacuum present in the inlet manifold. To boost the vacuum available to the brake booster, when there is little vacuum present in the inlet manifold for use by the brake booster, it has been proposed to use an aspirator connected to an inlet flow passage to the engine.

To minimize engine throttle control interference of the aspirator, the aspirator includes an aspirator valve controlling air flow through the aspirator. The aspirator valve normally permits flow through the aspirator when open and prevents air flow through the aspirator when closed. The combined aspirator and aspirator valve is normally referred to as a "combined valve and aspirator assembly."

At ambient temperatures at or below zero degrees Celsius, any moisture remaining in the aspirator valve after the engine is shut-down tends to freeze or "ice up." This icing up often produces a bond causing the aspirator valve to malfunction when restarting the engine.

SUMMARY OF THE INVENTION

A method of controlling an aspirator valve of a vacuum assisted braking system of a motor vehicle having an engine including the steps of determining occurrence of a key-on event following time period of engine shut down; assessing one or more vehicle conditions to determine a need to de-ice the aspirator valve; and in response to said need, rapidly opening and closing the aspirator valve multiple times to de-ice the aspirator valve.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
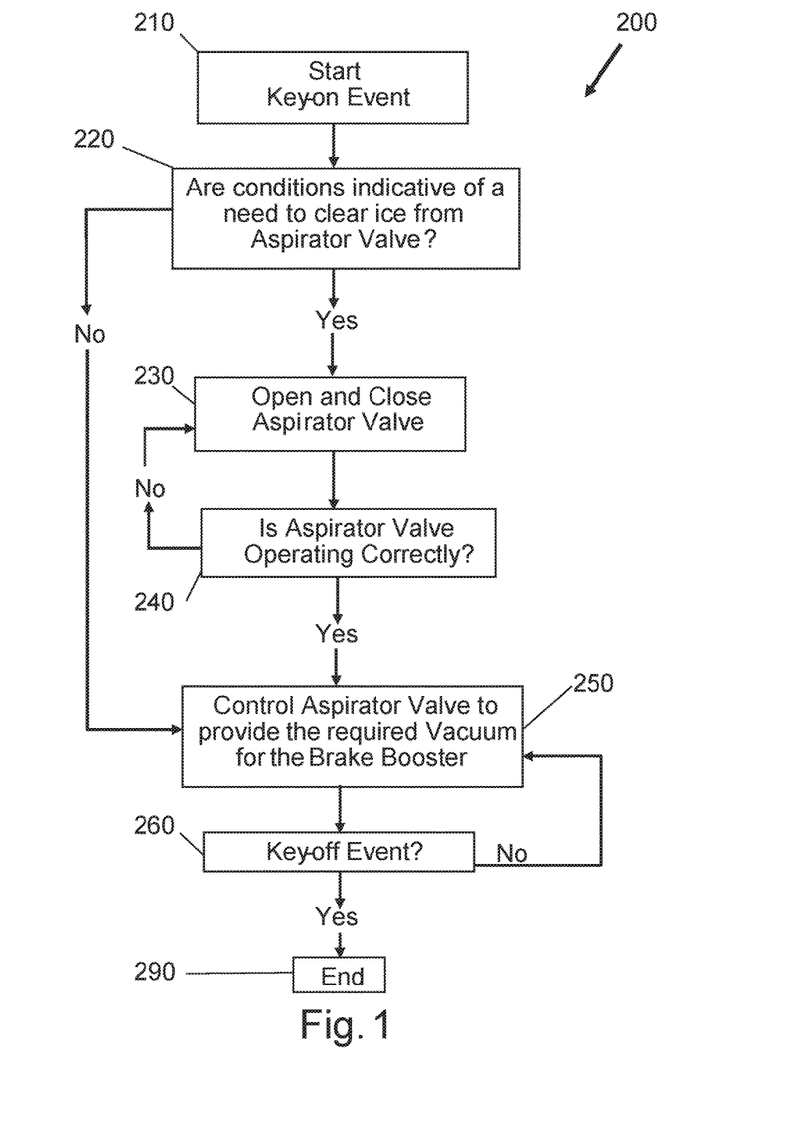
FIG. 1 is a flow chart of a method of controlling an aspirator valve according to an exemplary embodiment of the invention.

FIG. 1 shows an exemplary method 200 of controlling an aspirator valve starting at box 210 representing a key-on event. In older motor vehicles, a key operated switch often called an "ignition switch," control motor vehicle electrical circuits and starting of a motor vehicle engine. Moving the ignition switch to an "on" position is referred to as a "key-on" event, wherein further movement of the switch operates to engage the starter and the engine. Normally a short delay exists between enabling the electrical circuits and the engine of the motor vehicle actually running.

Moving the switch into an "off" position deactivates major electrical circuits of the motor vehicle and causes the engine of the motor vehicle to stop, referred to herein as a "key-off" event.

Many modern motor vehicles use a form of machine-human interface (HMI) rather than a key switch to cause or bring about a "key-on" and "key-off" event. This invention is not limited to any particular HMI. Any HMI that can cause or bring about switching on motor vehicle electrical circuits and subsequent starting of the engine or switching off the motor vehicle electrical circuits and stopping of the engine could be used.

From box 210 the method moves to box 220. The motor vehicle engine does not start immediately following the key-on event, a short delay exists between the key-on event and engine start. In the exemplary embodiment, the method 200 executes in this short period before engine start.

In box 220 the method checks whether conditions indicative of a need to clear ice from or de-ice the aspirator valve are present. If such conditions are not present the method advances directly to box 250 and the aspirator valve is controlled in a normal mode of operation to provide the required vacuum for a brake booster. From box 250 the method advances to box 260 to check whether a key-off event has occurred; if so the method 200 ends at box 290 otherwise it returns to box 250. Whenever a key-off event occurs the method ends.

Referring to box 220, nonlimiting examples of conditions used to assess a need to de-ice the aspirator valve include: whether engine coolant temperature is below a predefined temperature; whether intake manifold temperature is below a predefined temperature; whether an engine oil temperature is below a predefined temperature; whether the temperature of a body of the aspirator valve is below a predefined temperature; and whether ambient air temperature is below a predefined temperature. More than one condition could be used to determine whether ice is likely to have formed in the aspirator valve.

Ambient air temperature alone does not always provide an accurate assessment of the probability ice in the aspirator valve. Ambient air temperature is normally combined with a value indicative of the time since the engine was last running to allow for the time required for the aspirator valve to cool after the engine has been shut down.

If in box 220 the assessment results in a determination that ice has likely formed in the aspirator valve and will prevent the valve from operating or operating normally then the method advances to box 230.

In box 230 the method 200 operates to rapidly open and close the aspirator valve a number of times to break up any ice that may have formed. The number of cycles of this de-icing operation can be a fixed or varied amount based upon the severity of the operating conditions in which the aspirator valve is operating. For example, if the measured temperature of the aspirator valve is close to zero, then only a few cycles of ice clearing opening and closing may be needed, but, if the measured temperature of the aspirator valve is circa minus 20° C., then a larger number of ice clearing cycles is used.

From box 230 the method advances to box 240 wherein the method checks if the aspirator valve is correctly operating. Correct operation of the aspirator valve is assessed in several ways, for example, by using a position sensor to physically measure the position of the moveable valve member of the aspirator valve as it cycles or by comparing the force required to open the aspirator valve to a predefined value. With an electric solenoid operated aspirator valve, assessment could be a comparison of a measured current draw versus an expected current draw to open the aspirator valve.

In some embodiments, the step referred to in box 240 is not used and the method advances directly from box 230 to box 250. In either case, after de-icing has taken place the method moves to box 250 and controls the aspirator valve in a normal mode of operation to provide the required vacuum for a brake booster. Prior to reaching box 250 the engine will have started, so the engine will be running when box 250 is reached.

From box 250 the method advances to box 260 to check whether a key-off event has occurred and, if it has, the method ends at box 290 otherwise it returns to box 250.

In the exemplary embodiment, when ice is potentially present in the aspirator valve the aspirator valve is rapidly, fully opened and fully closed to break up any ice that may interfere with normal operation of the aspirator valve. The "de-icing" does not necessarily remove the ice from the aspirator valve, it operates to reduce any effect any remaining ice has on operation of the aspirator valve. After a few minutes of engine operation, the engine temperature heats the aspirator valve and melts any remaining ice.

Figure 2:
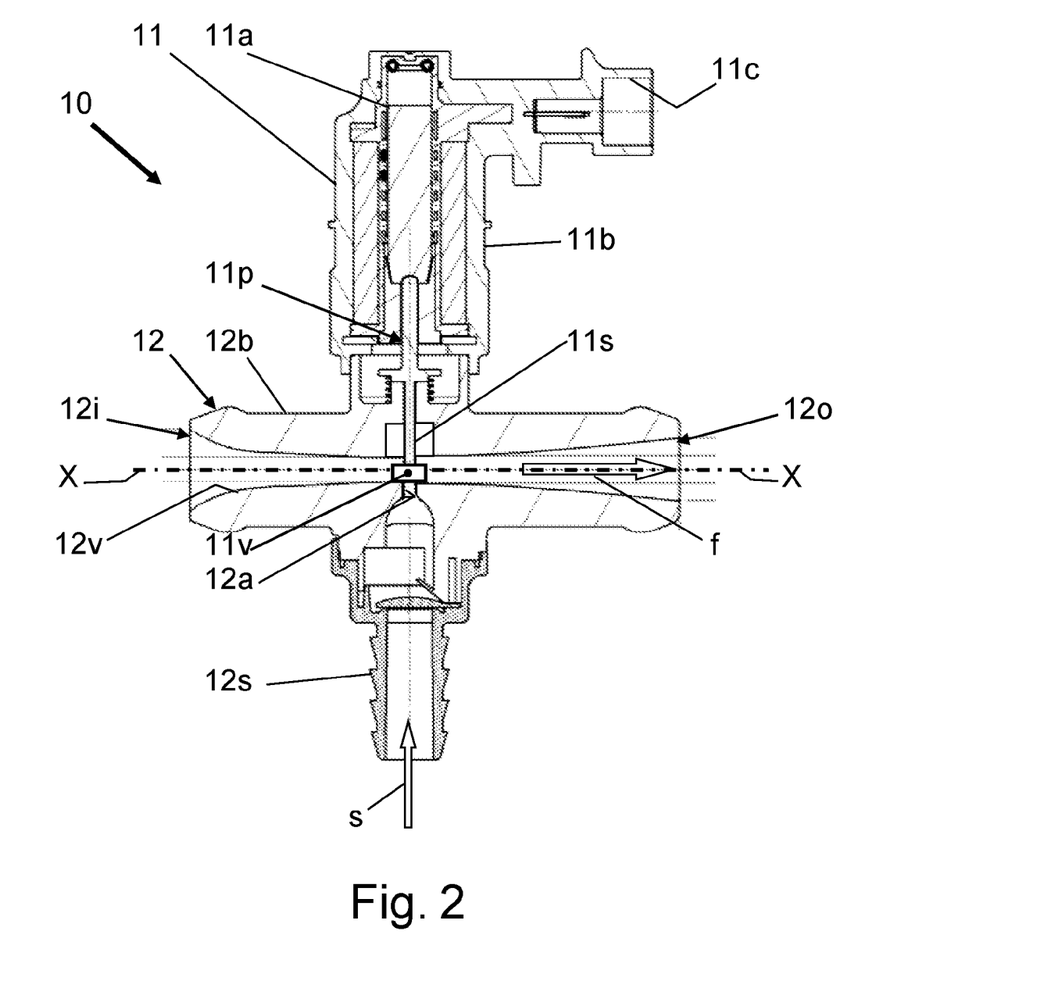
FIG. 2 is a cross-sectional view of a combined valve and aspirator assembly of a vacuum boosted braking system illustrating an aspirator valve for use with a motor vehicle in a closed state.
Figure 3:
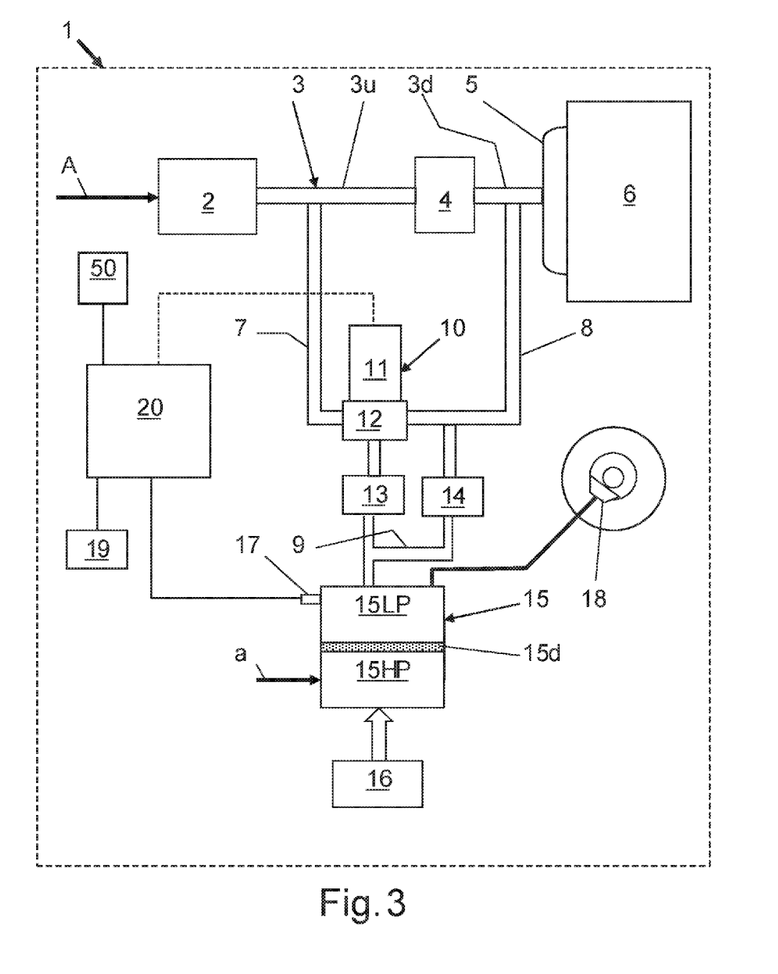
FIG. 3 is a schematic diagram of an embodiment of a motor vehicle according to the invention.

Referring to FIGS. 2 and 3 there is shown a motor vehicle 1 having an engine 6 and a vacuum assisted braking system, including a combined valve and aspirator assembly 10.

Ambient air is admitted to an induction system 3 for the engine 6 via an inlet 2 as indicated by the arrow A. The inlet 2 may include an air filter to remove particulate matter from the air entering the induction system 3.

The induction system 3 includes a first part 3u located upstream from a throttle valve 4 and a second part 3d located downstream from the throttle valve 4.

A combined valve and aspirator assembly 10 comprises an aspirator valve 11 and an aspirator 12.

As shown in FIG. 2, the aspirator 12 has an inlet end 12i connected to the first part 3u of the induction system 3 at a position upstream from the throttle valve 4 via a first conduit 7 and an outlet end 12o connected via second conduit 8 to the second part 3d of the induction system 3 at a position downstream from the throttle valve 4 and upstream from an inlet manifold 5 of the engine 6.

The aspirator 12 has a vacuum inlet 12s connected via a first one-way valve 13 to a low-pressure side 15LP of a vacuum brake booster 15. The vacuum brake booster 15 also includes a diaphragm 15d separating the low-pressure side 15LP from a high-pressure side 15HP of the brake booster 15. Air at atmospheric pressure is admitted to the high-pressure side 15HP of the brake booster 15 as indicated by the arrow a.

A mechanical input is provided to the brake booster 15 from a brake pedal 16 when the brake pedal is depressed by a driver of the motor vehicle 1. When the brake pedal 16 is depressed hydraulic fluid at pressure is supplied from a master cylinder (not shown), forming part the brake booster 15, to a number of brake calipers 18 used to brake the vehicle 1.

A bypass conduit 9 bypasses the first one-way valve 13 and includes a second one-way valve 14. The non-return valves 13, 14 prevent vacuum from being drawn back from the inlet manifold 5 when the pressure in the low-pressure side 15LP of the brake booster 15 is below the pressure in the inlet manifold 5. Flow from the inlet manifold 5 to the low-pressure side 15LP is prevented when the vacuum in the low-pressure side 15LP is greater than the vacuum in the inlet manifold 5.

The bypass conduit 9 is connected at one end at a position between the first one-way valve 13 and the low-pressure side 15LP and at an opposite end to the second part 3d of the induction system 3 at a position between the throttle valve 4 and the inlet manifold 5.

Opening and closing of the aspirator valve 11 is controlled by an electronic controller 20 in response to a number of inputs 50. The electronic controller 20 can be a single unit such as a powertrain control module or could be two or more interconnected units or modules operable in combination to effect control of the aspirator valve 11.

The electronic controller 20 receives, in this example, inputs 50 including an input from a pressure sensor 17 used to sense the magnitude of the vacuum subsisting in the low-pressure side 15LP of the brake booster 15 and an input from a temperature sensor (not shown) used to evaluate whether the conditions are indicative of those where icing of the aspirator valve 11 is likely to occur.

Opening and closing of the aspirator valve 11 during normal running of the engine 6 is based at least in part on the magnitude of the pressure sensed to be present in the low-pressure side 15LP of the brake booster 15 by the pressure sensor 17. It will be appreciated that in other examples the vacuum subsisting in the low-pressure side 15LP of the brake booster 15 could be modelled and not directly sensed.

The electronic controller 20 may directly control the aspirator valve 11 or may provide a signal to a separate unit (not shown) to control the medium used to control the opening and closing of the aspirator valve 11. For example, and without limitation, the electronic controller 20 may control a valve used to control the flow of pneumatic pressure or hydraulic pressure to the aspirator valve 11 or supply a control signal to an electrical power supply or electric power amplifier.

A human machine interface 19 is provided to switch "on" and switch "off" the major electric circuits of the motor vehicle 1 and to control starting and stopping of the engine 6.

With particular reference to FIG. 2, the combined valve and aspirator assembly 10 comprises the aspirator valve 11 and the aspirator 12 coupled together to form the combined valve and aspirator assembly 10.

The aspirator valve 11 comprises a body 11b in which is mounted an actuator 11a used to move a valve element in the form of a plug valve 11p having an elongate stem 11s supporting a valve head 11v.

In this example, the aspirator valve 11 is a normally closed valve and is opened by applying pneumatic pressure via an inlet port 11c. However, it will be appreciated that the invention is not limited to using a normally closed aspirator valve or to the type of actuator used for the aspirator valve 11. For example, the actuator could be an electrical actuator such as a solenoid valve or a hydraulic actuator.

The aspirator 12 has a body 12b defining a venturi 12v through which, in use, air flows in the direction indicated by the arrow f. The venturi 12v extends along a longitudinal axis X-X, shown horizontally disposed in FIG. 3, but need not be so disposed. An aperture 12a in the aspirator body 12b provides a connection between the venturi 12v and a vacuum inlet 12s.

The aspirator 12 is conventional in construction and operation. The flow of air through the venturi 12v causes the pressure in the region of smallest diameter to drop thereby drawing air out from the low-pressure side 15LP of the brake booster 15 via the first one-way valve 13 and into the aspirator 12 through the vacuum inlet 12s, as indicated by the arrow s. The air is then drawn via the aperture 12a into the venturi 12v.

During normal operation of the engine 6, the electronic controller 20 controls the aspirator valve 11 to move the plug valve 11 p between a position in which it covers the aperture 12a in the body 12b of the aspirator 12, as shown in FIG. 2—called an aspirator valve "closed" position, to a position in which the plug valve 11p does not obstruct the flow of air through the aperture 12a into the venturi 12v, called an aspirator valve 'open' position.

An annular valve seat surrounds the entrance to the aperture 12a for co-operation with the valve head 11v of the plug valve 11p. Although not shown in FIG. 2 one of the valve head 11v and the valve seat will in practice include a compressible seal such as an "O" ring or lip seal to improve sealing between the valve head 11v and the valve seat.

During normal operation of the aspirator valve 11, the plug valve 11p of aspirator valve 11 is moved to the open position when the magnitude of the vacuum in the inlet manifold 5 is less than that required for the low-pressure side 15LP of the brake booster 15 and is moved to the closed position when the magnitude of the vacuum in the inlet manifold 5 is sufficient for the low-pressure side 15LP of the brake booster 15.

During normal running of the engine 6 the operation of the combined valve and aspirator assembly 10 follows conventional operation.

However, in a shutdown situation, wherein the non-operating engine 6 of the motor vehicle 1 will operate in a low ambient temperature likely to produce icing in the combined valve and aspirator assembly 10, the electronic controller 20 is programmed in response to an input indicative of the likelihood of icing to rapidly fully open and fully close the aspirator valve 11 a number of times referred to as 'de-icing cycles' when a key-on event occurs.

The input to the electronic controller 20 indicative of potential icing can be one of several temperature sensor inputs, for example an engine coolant temperature sensor; an intake manifold temperature sensor; an engine oil temperature sensor; an aspirator valve temperature sensor; and an ambient air temperature sensor.

By comparing these sensors with a predefined limit, the electronic controller 20 can decide whether the aspirator valve 11 must be controlled to de-ice it.

By rapidly opening and closing the aspirator valve 11 any ice that has formed around the plug valve 11 p between the plug valve 11 p and the aspirator body 12b where it might collect in the venturi 12v is broken up.

Although not shown the valve head 11v can have a projection that engages with the aperture 12a with clearance when the aspirator valve 11 is closed wherein the projection on the valve head 11v acts as an ice pick clearing away any ice within the aperture 12a when ice clearing takes place.

In some embodiments, the number of cycles of opening and closing of the aspirator valve 11 depends upon the temperature the vehicle 1 has been idle in so that at very low ambient temperatures well below zero Celsius more open and close cycles are used than in ambient temperature close to zero Celsius. The electronic controller 20 in such a case varies the number of open and close cycles used to de-ice the aspirator valve based upon an assessment of the severity of potential ice buildup.

Whether de-icing is required may depend upon the time the vehicle has been idle or a combination of idle time and ambient temperature. If the vehicle is idle in an ambient temperature only slightly below zero Celsius for a short period ice will normally not have had time to form due to residual heat from the last engine run cycle. In such a case, the electronic controller 20 assesses the severity of potential ice buildup based upon the measurement of the length of time that the engine has remained off or not running and the measurement of the ambient temperature during this time.

In summary, when the engine 6 is restarted following an idle period in an environment at or below zero Celsius, the risk of the aspirator valve 11 malfunctioning due to ice bonding the plug valve 11p to the aspirator body 12b is eliminated by carrying out a de-icing method according to this invention when a key-on event occurs.

Therefore, immediately following a key-on and preferably prior to start-up of the engine 6, the aspirator valve 11 is cleared of any ice buildup. This is important because often, following an engine start, there is a need for replenishing the vacuum in the low-pressure side 15LP of the brake booster 15 but the magnitude of vacuum available directly from the engine 6 cannot achieve this and so effective operation of the aspirator 12 is required.

Figure 4:
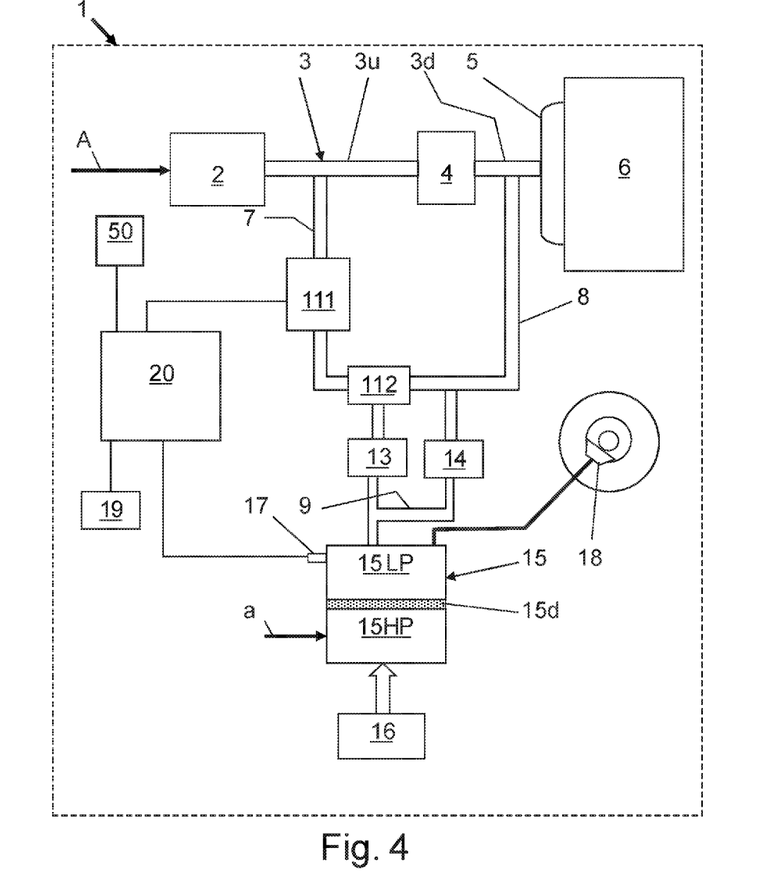
FIG. 4 is a schematic diagram of a second embodiment of a motor vehicle according to the invention.

Referring to FIG. 4, there is shown a motor vehicle 1 in most respects the same as previously described with respect to FIG. 3 and so will not be described again in detail. The only significant difference is that in this embodiment the aspirator valve 111 is separate from the aspirator 112 and is positioned upstream from the aspirator 112 to control the flow of air from the first part 3u of the induction system 3 via the first conduit 7 to an inlet end of the aspirator 112 rather than the flow of air from the low-pressure side 15LP of the vacuum brake booster 15.

Figure 5:
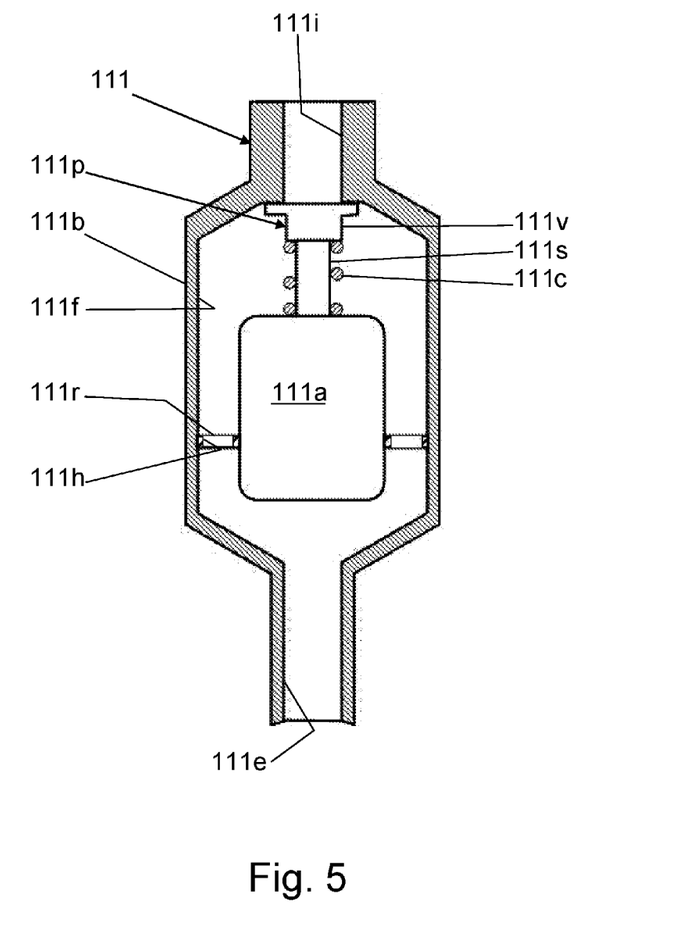
FIG. 5 is a cross-sectional view through an aspirator valve forming part of a vacuum boosted braking system of the motor vehicle shown in FIG. 4 showing the aspirator valve in a closed state.
Figure 6:
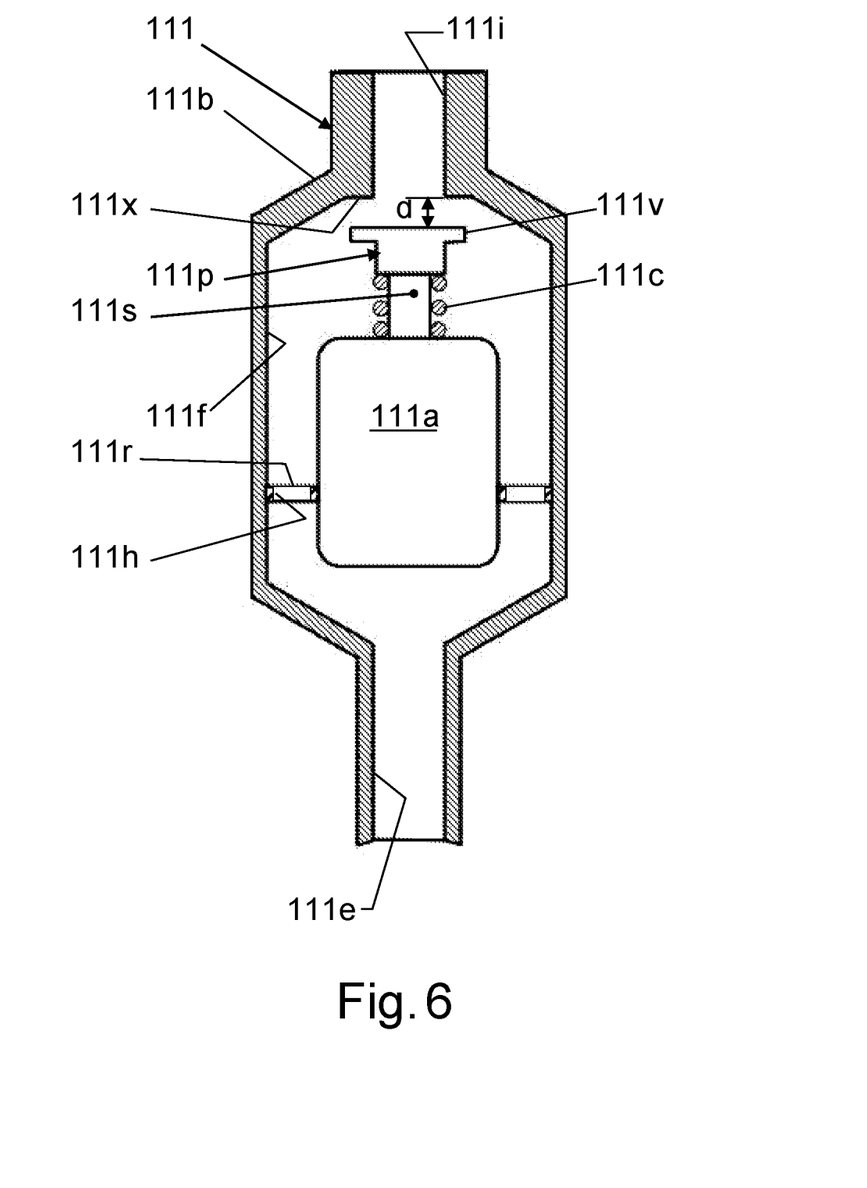
FIG. 6 is a cross-sectional view of the aspirator valve of FIG. 5 showing the aspirator valve in an open state.

FIGS. 5 and 6 show in greater detail the aspirator valve 111 in respective closed and open states.

The aspirator valve 111 comprises a body 111b in which is mounted an electric solenoid actuator 111a used to move a valve element in the form of a plug valve 111p. The plug valve 111p has an elongate stem 111s engaged with the actuator 111a and a valve head 111v supported by the elongate stem 111s. A helical spring 111c overlying the elongate stem 111s is used to bias the plug valve 111p into a closed position as shown in FIG. 5.

An annular ring 111r is used to support the actuator 111a within a cavity 111f defined by the body 111b. The annular ring 111r has a number of circumferentially spaced apertures or holes 111h formed therein to allow air to flow from an inlet 111i of the aspirator valve 111 to an outlet 111e of the aspirator valve 111 when the aspirator valve 111 is in an open state as shown in FIG. 6.

The aspirator valve 111 is a normally closed valve and is opened by applying electrical power to the electric solenoid actuator 111. However, it will be appreciated that the invention is not limited to using a normally closed aspirator valve or to the type of actuator used for the aspirator valve 111. For example, the actuator could be a pneumatic actuator or a hydraulic actuator.

The aspirator valve 111 opens when insufficient vacuum is generated in the intake manifold 5 to produce the required vacuum in the low pressure-side 15LP of the vacuum brake booster 15 and that the bypass conduit 9, bypassing the first one-way valve 13 and including the second one-way valve 14, is used to produce the required vacuum in the low pressure-side 15LP of the vacuum brake booster 15 when the aspirator valve 111 is closed and sufficient vacuum is generated in the intake manifold 5.

The valve head 111v of the aspirator valve 111 is moveable between open and closed positions by the solenoid actuator 111a in response to a control signal or signals from the electronic controller 20. In the open position, the valve head 111v of the aspirator valve 111 is spaced a distance "d" from an annular valve seat 111x formed in the valve body 111b for co-operation with the valve head 111v. In this state air can flow freely from the inlet 111i of the aspirator valve 111 to the outlet 111e of the aspirator valve 111 and from there to the aspirator 112.

When the aspirator valve 111 is in the closed state the valve head 111v abuts against the valve seat 111x and, although not shown, a compressible seal between the valve seat 111x and the valve head 111v will be compressed thereby preventing air from flowing through the aspirator valve 111.

Figure 7:
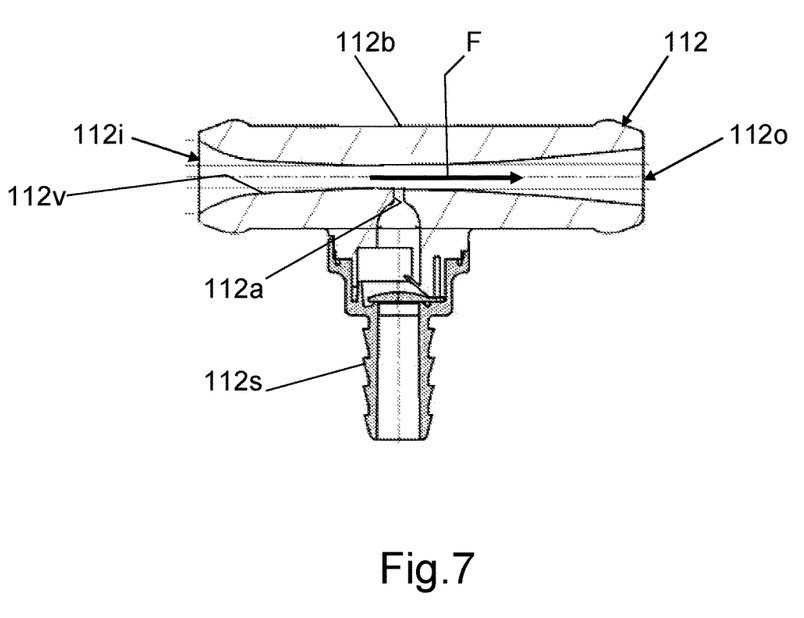
FIG. 7 is a cross-sectional view through an aspirator forming part of the vacuum boosted braking system of the motor vehicle shown in FIG. 4.

The aspirator 112 shown in FIG. 7 has a body 112b defining a venturi 112v having an inlet end 112i arranged to receive a supply of air from the aspirator valve and an outlet end 112o connected by the second conduit 8 to the second part 3d of the induction system 3 at a position downstream from the throttle valve 4 and upstream from an inlet manifold 5 of the engine 6. In use, air flows in the direction indicated by the arrow F from the inlet 112i to the outlet 112o of the venturi 112v.

An aperture 112a in the aspirator body 112b at the smallest diameter provides a connection between the venturi 112v and a vacuum inlet 112s connected to the low-pressure side 15LP of a vacuum brake booster 15.

The aspirator 112 is conventional in construction and operation. The flow of air through the venturi 112v causes the pressure in the region of smallest diameter to drop thereby drawing air out from the low-pressure side 15LP of the brake booster 15 via the first one-way valve 13 and into the aspirator 112 through the vacuum inlet 112s. The air is then drawn via the aperture 112a into the venturi 112v.

During normal operation of the engine 6, the electronic controller 20 controls the aspirator valve 111 to move the plug valve 111p between the "closed" position to a position in which the plug valve 111p does not obstruct the flow of air through the body 111b called an aspirator valve "open" position.

The aspirator valve 111 during normal operation is moved to the open position when the magnitude of the vacuum in the inlet manifold 5 is less than that required for the low-pressure side 15LP of the brake booster 15 and is moved to the closed position when the magnitude of the vacuum in the inlet manifold 5 is sufficient for the low-pressure side 15LP of the brake booster 15. Therefore, during normal running of the engine 6 the operation of the aspirator valve 111 follows conventional practice.

However, when the engine 6 has been shut down, where operation of the motor vehicle 1 in a low ambient temperature likely to produce icing in the aspirator valve 111, the electronic controller 20 is programmed in response to an input indicative of potential icing to rapidly open and close the aspirator valve 111 when the engine is restarted. The input indicative of potential icing is as before an input from one or more temperature sensors forming one input 50 to the electronic controller 20.

This rapid opening and closing of the aspirator valve 111 breaks up any ice formed around the plug valve 111p between the valve head 111v and the body 111b.

Although not shown, the valve head 111v can have a projection that engages with the inlet 111i of the body 111b with clearance when the aspirator valve 111 is in the closed state. With such an arrangement, the projection acts as an ice pick breaking up ice in the inlet 111i close to the valve seat 111x when de-icing takes place.

As before, the number of cycles of opening and closing of the aspirator valve 111 can be based upon the temperature the vehicle 1 has been idle in, wherein at low ambient temperatures well below zero Celsius more open and close cycles are used than in ambient temperature close to zero Celsius. In other embodiments, a fixed number of cycles are used. The electronic controller 20 in such a case varies the number of open and close cycles used to de-ice the aspirator valve based upon an assessment of the severity of potential ice buildup.

Whether de-icing is required may also depend upon the time the vehicle has been idle or a combination of idle time and ambient temperature. This is because if the vehicle is idle in an ambient temperature only slightly below zero Celsius for a short period of time ice will normally not have time to form due to residual heat from the last engine run cycle. In such a case, the electronic controller 20 assesses the severity of potential ice buildup based upon the measurement of the length of time that the engine has remained shut down and the measurement of the ambient temperature during the shutdown period.

Therefore, as before, when the engine 6 is restarted following an idle period in an environment below zero Celsius, the risk of the aspirator valve 111 malfunctioning due to ice bonding the plug valve 111p to the body 111b is eliminated by carrying out a de-icing method in accordance with this invention when a key-on event occurs.

It will be appreciated that the term "de-ice" as meant herein means to clear ice that has built up in the aspirator valve by a percussive process and not melt ice in the aspirator valve.

The disclosed embodiment provides a method of controlling an aspirator valve of a vacuum assisted braking system of a motor vehicle having an engine. The method starts when a key-on event occurs following period of time during which the engine of the motor vehicle has been shut down and includes checking whether a vehicle condition indicates a need to de-ice the aspirator valve and, if so, rapidly opening and closing the aspirator valve a number of times to de-ice the aspirator valve.

Vehicle conditions indicative of a need to de-ice the aspirator valve may include a current temperature that is below a predefined temperature limit with a need established by comparing the current temperature with the predefined temperature limit. The current temperature may be one of ambient temperature, engine coolant temperature, engine oil temperature, air intake temperature and aspirator valve temperature.

The method may include varying the number of cycles the aspirator valve is opened and closed based upon an assessment of the severity of potential ice buildup. The severity of potential ice buildup may be assessed based upon the length of time that the engine has remained shut down and the ambient temperature during the shutdown period.

At least one ice breaking cycle may be completed before the engine is running following a key-on event.

Another embodiment includes a motor vehicle having an engine, a human machine interface to switch on and off the electrical circuits with the engine and a vacuum assisted braking system including an aspirator valve. An aspirator and an electronic controller controlling opening and closing of the aspirator valve in response to one or more inputs. When a key-on event occurs following a period of time during which the engine of the motor vehicle has been shut down, the electronic controller checks whether at least one input indicates a need to de-ice the aspirator valve and, if so, the electronic controller controls operation of an actuator of the aspirator valve to produce a number of rapid open and close cycles of the aspirator valve.

An input indicative of a need to remove ice may include a current sensed temperature below a predefined temperature limit, including a comparison by the electronic controller of the current sensed temperature with the predefined temperature limit.

Additional inputs may include a sensed current ambient temperature, a sensed current engine coolant temperature, a sensed current engine oil temperature, a sensed current temperature of an air intake of the engine and a sensed current temperature of part of the aspirator valve.

The electronic controller may further control the aspirator valve to vary the number of open and close cycles used to de-ice the aspirator valve based upon an assessment of the severity of potential ice buildup.

The severity of potential ice buildup may be assessed based upon a measurement of the length of time that the engine has remained shut down and a measurement of the ambient temperature during the shutdown period.

The electronic controller may carry out at least one open and close cycle of the aspirator valve before the engine is running.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of controlling an aspirator valve of a vacuum assisted braking system of a motor vehicle having an engine comprising:
   determining occurrence of a key-on event following time period of engine shut down;
   assessing one or more vehicle conditions to determine a need to de-ice the aspirator valve; and,
   in response to said need, rapidly opening and closing the aspirator valve multiple times to de-ice the aspirator valve.

2. The method of claim 1 wherein the vehicle conditions assessed include a current temperature that is below a predefined temperature limit.

3. The method of claim 2 wherein the need is determined by comparing the current temperature with the predefined temperature limit.

4. The method of claim 2 wherein the current temperature is one of ambient temperature, engine coolant temperature, engine oil temperature, air intake temperature and aspirator valve temperature.

5. The method of claim 1 including varying the number of cycles the aspirator valve opens and closes based upon the assessed vehicle conditions and correspondingly potential ice buildup.

6. The method of claim 5 wherein the assessed vehicle conditions and correspondingly potential ice buildup includes a length of time that the engine has remained shut down and an ambient temperature during the shutdown period.

7. The method of claim 1 including opening and closing the aspirator at least before the engine is running following a key-on event.

8. A system for de-icing an aspirator of a vacuum assisted braking system of a motor vehicle comprising:
   an engine;
   a human machine interface to switch on and off the engine;
   an aspirator valve;
   an electronic controller to control opening and closing of the aspirator valve in following a period of time during which the engine has been shutdown, the electronic controller receiving and checking at least one input indicating a need to de-ice the aspirator valve wherein in response to said at least one input the electronic controller generates a signal causing movement of an actuator of the aspirator valve through a number of rapid open and close cycles.

9. The system of claim 8 wherein the at least one input indicative of a need to de-ice the aspirator valve includes a current sensed temperature below a predefined temperature limit.

10. The system of claim 9 wherein the controller compares the current sensed temperature with the predefined temperature limit.

11. The system of claim 9 wherein the at least one input includes a sensed current ambient temperature, a sensed current engine coolant temperature, a sensed current engine oil temperature, a sensed current temperature of an air intake of the engine, and a sensed current temperature of part of the aspirator valve.

12. The system of claim 8 wherein the electronic controller varies the number of open and close cycles based on an assessment of the severity of potential ice buildup.

13. The system of claim 12 wherein the severity of potential ice buildup is based upon a measurement of a length of time that the engine has remained shut down and a measurement of an ambient temperature during the shutdown period.

14. The system of claim 8 wherein the controller carries out at least one open and close cycle of the aspirator valve before the engine is running.

\* \* \* \* \*